(12) United States Patent
Edelen

(10) Patent No.: US 9,850,891 B2
(45) Date of Patent: Dec. 26, 2017

(54) ANALOG FLOW CONTROL

(71) Applicant: Funai Electric Co., Ltd., Osaka (JP)

(72) Inventor: John Glenn Edelen, Versailles, KY (US)

(73) Assignee: Funai Electric Co., Ltd. (JP)

(*) Notice: Subject to any disclaimer, the term of this patent is extended or adjusted under 35 U.S.C. 154(b) by 238 days.

(21) Appl. No.: 14/951,836

(22) Filed: Nov. 25, 2015

(65) Prior Publication Data

US 2017/0146005 A1    May 25, 2017

(51) Int. Cl.

| | | |
|---|---|---|
| F04B 49/06 | (2006.01) |
| A24F 47/00 | (2006.01) |
| B41J 2/175 | (2006.01) |
| F04B 19/00 | (2006.01) |
| G05D 7/06 | (2006.01) |
| F04D 33/00 | (2006.01) |

(52) U.S. Cl.
CPC .......... *F04B 49/065* (2013.01); *A24F 47/008* (2013.01); *B41J 2/17596* (2013.01); *F04B 19/006* (2013.01); *F04D 33/00* (2013.01); *G05D 7/0676* (2013.01)

(58) Field of Classification Search
CPC ...... F04B 49/065; F04D 33/00; G05D 7/0676
See application file for complete search history.

(56) References Cited

U.S. PATENT DOCUMENTS

| | | | |
|---|---|---|---|
| 4,839,665 A | 6/1989 | Hertz et al. |
| 6,467,863 B1 | 10/2002 | Imanaka et al. |
| 6,893,115 B2 | 5/2005 | Hadimioglu et al. |
| 8,474,937 B2 | 7/2013 | Jeong et al. |
| 2012/0186594 A1* | 7/2012 | Liu ...................... A24F 47/008 | 131/329 |
| 2015/0114409 A1 | 4/2015 | Brammer et al. |

FOREIGN PATENT DOCUMENTS

JP         07178951 A1    7/1995

* cited by examiner

*Primary Examiner* — Jill A Warden
*Assistant Examiner* — Matthew D Krcha
(74) *Attorney, Agent, or Firm* — Luedeka Neely Group, PC

(57) ABSTRACT

A microfluidic pump having a firing mechanism for ejecting fluid out of a firing chamber during a firing sequence, which includes a firing step followed by a wait step. A power circuit activates and deactivates the firing mechanism in response to a control signal, which controls the timing of each step and is provided by a logic circuit. The control signal controls the firing step and is dependent on a predetermined fixed frequency signal provided by a first oscillator. The control signal controls the wait step and is dependent on a variable frequency signal provided by a second oscillator. A first input provides a variable input signal to the second oscillator. The second oscillator varies the variable frequency signal according to the variable input signal. The logic circuit also varies the control signal based on the variable frequency signal to vary the length of the wait step.

21 Claims, 5 Drawing Sheets

ANALOG FLOW CONTROL

TECHNICAL FIELD

This invention relates to the field of microfluidic pumps. More particularly, this invention relates to a microfluidic pump for dispensing a fluid at a flow rate that is based on a variable analog input.

BACKGROUND

Microfluidic devices are used to manipulate and precisely dispense defined microscopic volumes of liquid inside micro-sized structures. For example, a tab-based titration system may include a microfluidic pump that is programmed to dispense a fixed volume of reagent onto a well plate. In that case both the amount of liquid to dispense and the time taken to dispense may be fixed to define a fluid flow rate for the system.

A microfluidic pump may also be used to dispense a respiratory drug to a patient. In that case, the way the patient uses the pump represents a non-constant external variable. The amount of drugs to be administered to the patient at any particular time may not be constant and, for that reason, the most effective means for delivering a defined dose may not be a fixed flow rate. A more effective method for delivering the dose, in that case, would be to adjust the amount of medicament being dispensed based on the patient's behavior. In that case, when the user's inhale force is greater, the flow rate increases to deliver more fluid. On the other hand, when the user's inhale force is lighter, the flow rate decreases to deliver less fluid.

Microfluidic pumps are also used in inkjet printing. In an inkjet printing application, the output flow rate of ink is variable. The flow rate is often determined by a thermal ejector chip, which may dispense ink directly across an air path onto a paper substrate. Traditionally, the ink flow rate is controlled by adjusting the number of heaters selected for firing along with the firing rate for each element. However, this process required multiple digital inputs, which had to be updated for each firing cycle. While this level of control may be necessary for printing applications, it adds complexity and cost to these microfluidic devices and, for at least these reasons, is not optimal for all applications.

There is a need for a microfluidic device which can be activated and controlled, including the ability to adjust the flow rate, in order to deliver a prescribed amount of fluid with a minimal number of inputs.

The present disclosure advantageously provides a microfluidic pump for carrying out a firing sequence to eject a fluid where the flow rate may be varied based on a variable analog input.

In one aspect, the microfluidic pump includes a fluid supply source for supplying a fluid, a firing chamber for carrying the fluid supplied by the fluid supply source. The firing chamber includes a nozzle that is in fluid communication with the firing chamber. A firing mechanism in fluid communication with the firing chamber ejects fluid out of the firing chamber through the nozzle during a firing sequence. The firing sequence includes at least a firing step, where the firing mechanism is activated and fluid is ejected from the firing chamber as a result of the firing mechanism activating, followed by a wait step, where the firing mechanism is deactivated for providing a time delay between subsequent firing steps.

The pump also includes a power circuit in electric communication with the firing mechanism for activating and deactivating the firing mechanism in response to a control signal. A logic circuit, in electric communication with the power circuit, send a control signal to the power circuit. The control signal controls the length of time of each step in the firing sequence. The control signal is dependent on a predetermined fixed frequency signal and it controls the firing step. The control signal may also be dependent on a variable frequency signal to control the wait step.

The predetermined fixed frequency signal and the variable frequency signal are provided by a first and second oscillator, respectively. The first oscillator is in electric communication with the logic circuit and sends a predetermined fixed frequency signal to the logic circuit. The fixed frequency signal is a series of timing pulses, wherein each pulse is separated by a fixed time interval. The second oscillator is in electric communication with the logic circuit and sends a variable frequency signal to the logic circuit. The variable frequency signal is a series of timing pulses wherein each pulse is separated by a variable time interval.

The pump also includes a first input for providing a variable input signal to the second oscillator. The second oscillator varies the interval of time separating each pulse of the series of timing pulses of the variable frequency signal according to the variable input signal from the first input. The logic circuit is configured to vary the control signal according to the frequency of the variable frequency signal from the second oscillator to thereby vary the length of the wait step and, as a result, vary the time between ejections of fluid from the firing chamber.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
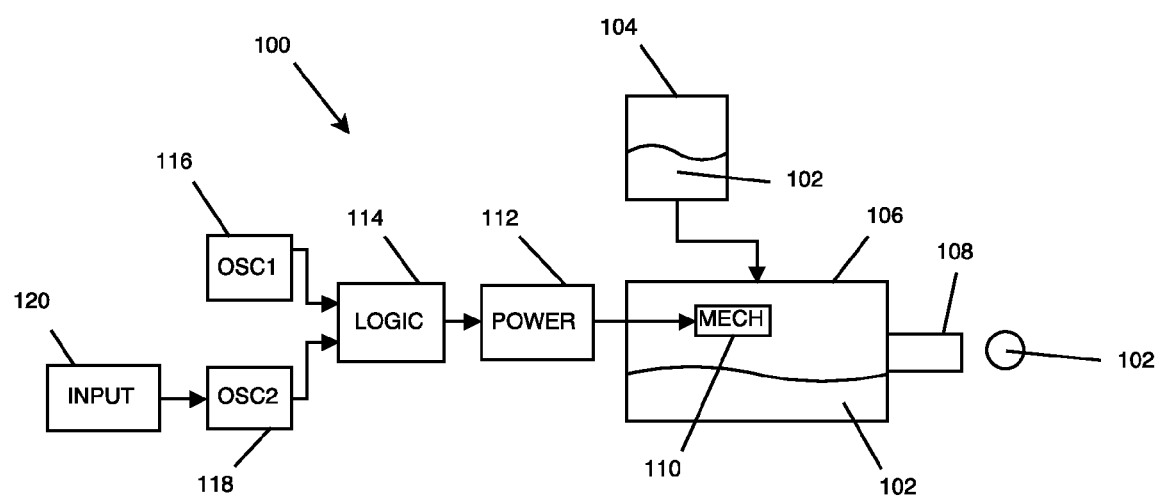
FIG. 1 is a schematic diagram of a microfluidic pump for ejecting a fluid at a flow rate based on a variable input according to the disclosure.

Referring now to the drawings, there is shown in FIG. 1 a schematic diagram representing a microfluidic pump 100 according to an embodiment of the present disclosure. The pump 100 generally includes a fluid 102 and fluid supply source 104 for storing and supplying the fluid. The fluid supply source 104 supplies fluid 102 to a firing chamber 106. The firing chamber 106 includes a nozzle 108 and a firing mechanism 110. The firing mechanism 110 is configured to eject fluid 102 out of the firing chamber 106 through the nozzle during a firing sequence. One example of a firing mechanism 110 is a heater array that is used in inkjet printing applications. In general, approximately the same volume of fluid is ejected during each firing sequence. The flow rate of the pump 100, therefore, is varied based on how often those ejections occur rather than varying the amount of fluid ejected during each firing sequence.

Figure 2:
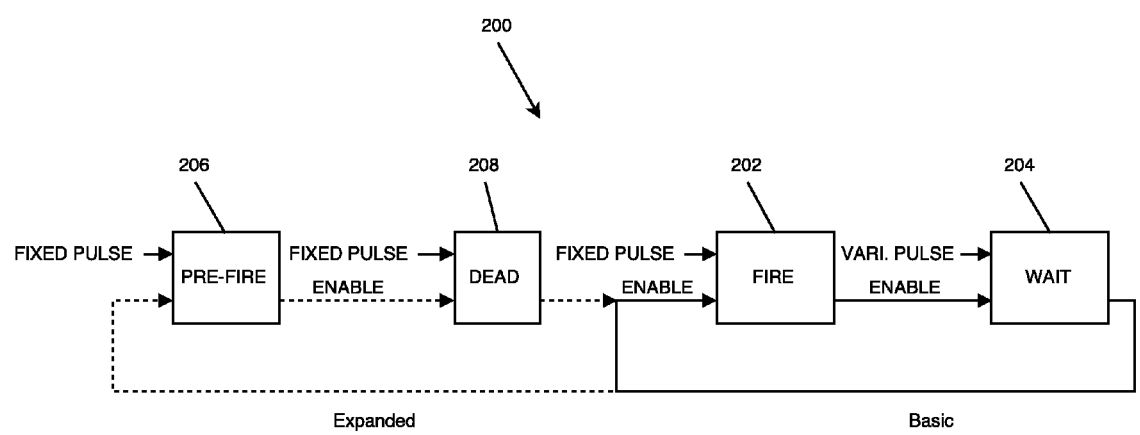
FIG. 2 is a flow diagram showing the sequence of events for ejecting a fluid from a microfluidic pump during a firing sequence.

With reference to FIG. 2, a basic firing sequence 200 includes a firing step 202 where the firing mechanism is activated and fluid is ejected from the firing chamber as a result. After the firing step 202, the next step in the sequence 200 is a wait step 204, where the firing mechanism is deactivated and does nothing. Following the wait step 204, the firing sequence is complete and may then be repeated. The flow rate of the pump is related to the number of firing steps 202 (i.e., fluid ejections) that occur within a given amount of time. The length of the wait step 204 determines how often firing steps 202 occur. As the wait step 204 is shortened, firing steps 202 occur more often, which results in a higher flow rate. As the wait step 204 is lengthened, firing steps 202 occur less often, which results in a lower flow rate. Therefore, the length of the wait step 204 directly impacts the flow rate of the pump.

The firing sequence 200 may be expanded to include a pre-fire step 206 and a dead step 208, which, in combination, allow the fluid to be preheated prior to the firing step 202. During the pre-fire step 206, the firing mechanism is activated in such a way that fluid is not ejected from firing chamber. For example, the firing mechanism may be activated for only a very short time and then deactivated. During the dead step 208 that follows, the firing mechanism remains deactivated. The dead step 208 is a time delay that allows the heat from the firing mechanism to heat the fluid prior to the firing step 202. Preheating the fluid in this manner is not required, but may make the firing step 202 more accurate and predictable than if the fluid is not preheated. Accuracy and predictability are useful and often required for certain applications of microfluidic pumps, such as inkjet printing applications, but may not be required for other types of applications.

Returning to FIG. 1, a power circuit 112 is in electric communication with the firing mechanism 110 and causes the firing mechanism to be activated and deactivated in response to a control signal. The control signal is provided to the power circuit 112 by a logic circuit 114, which is in electric communication with the power circuit. The control signal determines the timing of each step in the firing sequence, including when each step occurs and how long each step lasts. The control signal is dependent on a predetermined fixed frequency signal, and it controls when the pre-fire step, the dead step, and the firing step occur and how long each step lasts. The control signal may also be dependent on a variable frequency signal, and it controls when the wait step occurs and how long it lasts. The fixed and variable frequency signals are discussed in greater detail below. In one embodiment, the power circuit is a relay, such as a power FET connected between a power source and the firing mechanism. The control signal is an on or off signal that turns the relay on or off and thereby powers the firing mechanism 110, or un-powers the firing mechanism 110.

The predetermined fixed frequency signal and the variable frequency signals are signals provided to the logic circuit 114 by a first oscillator 116 and a second oscillator 118, respectively. The predetermined fixed frequency signal generated by the first oscillator 116 is a series of timing pulses, where each timing pulse is separated by a fixed time interval that remains constant over time. The pre-fire, dead, and tire steps are dependent on the control signal, which, in turn, depends on the fixed frequency signal. For that reason, the timing and length of those sequence steps remain constant from one firing sequence to the next. Thus, those steps may be very closely controlled and to remain consistent over time. In the case of pump for delivering respiratory drugs, for example, this type of controlled, consistent behavior ensures that a consistent amount of medicine is delivered during each firing step On the other hand, the variable frequency signal generated by the second oscillator 118 is a series of timing pulses, where each timing pulse is separated by a variable time interval that may vary over time. In other words, the second oscillator 118 produces pulses at a faster or slower pace depending on the length of the time interval separating timing pulses. The wait step is dependent on the variable frequency signal. For that reason, the timing and length of the wait step may vary over time.

The time interval between the timing pulses of the second oscillator 118 are varied based on a variable input signal. For example, in certain embodiments, the second oscillator 118 may comprise a voltage controlled oscillator (VCO), which generates a VCO signal, where the frequency of that VCO signal changes based on an input. The pump 100 includes a first input 120 for providing a variable input signal to the second oscillator to vary the frequency of the VCO signal. The first input 120 may include, for example, a sensor, such as a pressure sensor, a dial, or other similar types of input devices. The second oscillator 118 varies the frequency of the VCO signal, which may be a series of timing pulses separated by an interval of time. The frequency of the VCO signal may be varied by varying the interval of time separating each timing pulse according to the variable input signal from the first input 120. In the case of a proportionate relationship, increasing the variable input signal results in a larger time interval between each timing pulse in the variable frequency signal (i.e., a lower frequency signal). By contrast, in the case of an inversely proportionate relationship, increasing the variable input signal would result in a shorter time interval between each timing pulse in the variable frequency signal (i.e., a higher frequency signal). Either type of oscillator 118 may be used depending on the particular application to which it applied.

The logic circuit 114 is configured (such as by programming) to vary the control signal according to the frequency of the variable frequency signal from the second oscillator 118, which causes the wait step to be lengthened or shortened. In the case of a proportionate relationship, increasing the frequency would result in a control signal that lengthens the wait step. By contrast, in the case of an inversely proportionate relationship, increasing the frequency would result in a control signal that shortens the wait step. The latter relationship is usually preferred for most applications. By lengthening or shortening the wait step, the time between firing steps also varies. As the time of the wait period decreases, firing steps occur more often, resulting in a higher flow rate from the pump. As the time of the wait period decreases, firing steps occur less often, resulting in a lower flow rate from the pump. Thus, the present disclosure provides a microfluidic pump wherein the flow rate of the pump may be determined based on a single variable input. In one embodiment the logic circuit 114 may be fixed logic that is programmed in the sense that the original design of the logic circuit is its program. Such fixed logic may not be reprogrammed without physically changing the circuit. The advantage of fixed logic is simplicity, low cost, stability, reliability and resistance to tampering. In many applications this low cost embodiment is desirable. In other applications, more flexibility may be needed which may require reprogrammable logic.

Figure 3:
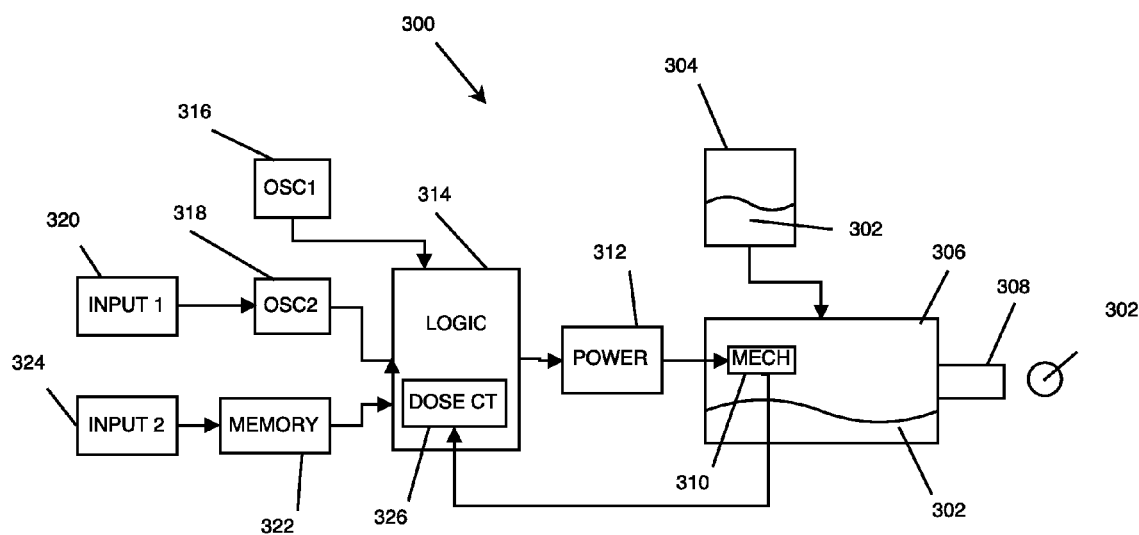
FIG. 3 is a schematic diagram of a microfluidic pump for ejecting a fluid at a flow rate based on a variable input according to an alternative embodiment of the disclosure.

With reference to FIG. 3, there is shown an embodiment of a reprogrammable microfluidic pump 300 having a fluid 302, fluid supply source 304, firing chamber 306, nozzle 308, firing mechanism 310, power circuit 312, logic circuit 314, first oscillator 316, second oscillator 318, and first input 320. Each of these are substantially similar to equivalent elements discussed previously.

In addition, this pump 300 also includes a memory 322 for storing a control variable for setting the length of each of the firing sequence steps. In the pump 100 described previously and shown in FIG. 1, the length of each of the firing steps was predetermined and was fixed into the logic circuit 114. However, in this case, the length of the firing sequence steps may be changed by entering a new control variable into the memory 322 through a second input 324. The logic circuit 114, first oscillator 116, second oscillator 118, and memory 322 may be combined as a single system such as a programmable logic controller or as fully programmable processor.

The control variables may be input via the second input 324, such as a keyboard, dial, etc. A separate variable may be assigned to each step in the firing sequence, and that control variable will determine how long that step will last. In particular, each step in the sequence is sustained until the fixed frequency signal or the variable frequency signal, depending on the sequence step involved, is equal to the control variable assigned to that particular step. Once the specified amount of time has elapsed (determined by counting pulses), the logic circuit 314 sends a control signal to the power circuit 312 to initiate the next step in sequence. As a brief example, the firing step is controlled by the control signal, which, in turn, is based on a predetermined fixed frequency signal generated by the first oscillator 316. If a control variable of 500 timing pulses, is assigned to the firing step, the firing step will be sustained until the fixed frequency signal indicates that 500 timing pulses have elapsed. At that point, the logic circuit 314 will send a control signal to the power circuit 312 to end the firing step and to begin the next step in the sequence. As mentioned above, each step in the firing sequence may be assigned a different control variable. This enables the firing sequence to be highly customizable while, at the same time, minimizing the number of inputs required to do so. The wait step is controlled by a variable frequency signal. If a control variable of 1000 is assigned to the wait step, the logic circuit 314 will sustain the wait step until 1000 pulses of the VCO signal have been counted. Since the VCO signal is variable in frequency, the length of time of the wait step is likewise variable. After the wait step is finished, when the logic has counted 1000 pulses of the VCO signal, the logic 314 begins the firing sequence again.

A final aspect of the pump 300 shown in FIG. 3 is a dose counter 326, which may be programmed to shut down the operation of the pump once a predetermined dose amount of fluid has been ejected. As with the control variables discussed above, the desired dose amount may be saved to the memory 322. The firing mechanism 310 is configured to send a signal to the dose counter 326 at the completion of a firing sequence. Since the volume of fluid ejected during each firing sequence remains constant, the volume of fluid ejected may be calculated simply by knowing the number of firing sequences that have occurred. In this regard, the dose counter 326 registers the signal from the firing mechanism 310 as a dose amount which is added to a total administered dose amount, which is stored in the memory 322. The logic circuit 314 reads the total administered dose amount from the memory 322 and is programmed to provide a termination signal to the power circuit 312 once the administered dose amount is equal to the preprogrammed desired dose amount. In response to the termination signal, the power circuit 312 deactivates the firing mechanism 310 and discontinues firing sequences.

Figure 4:
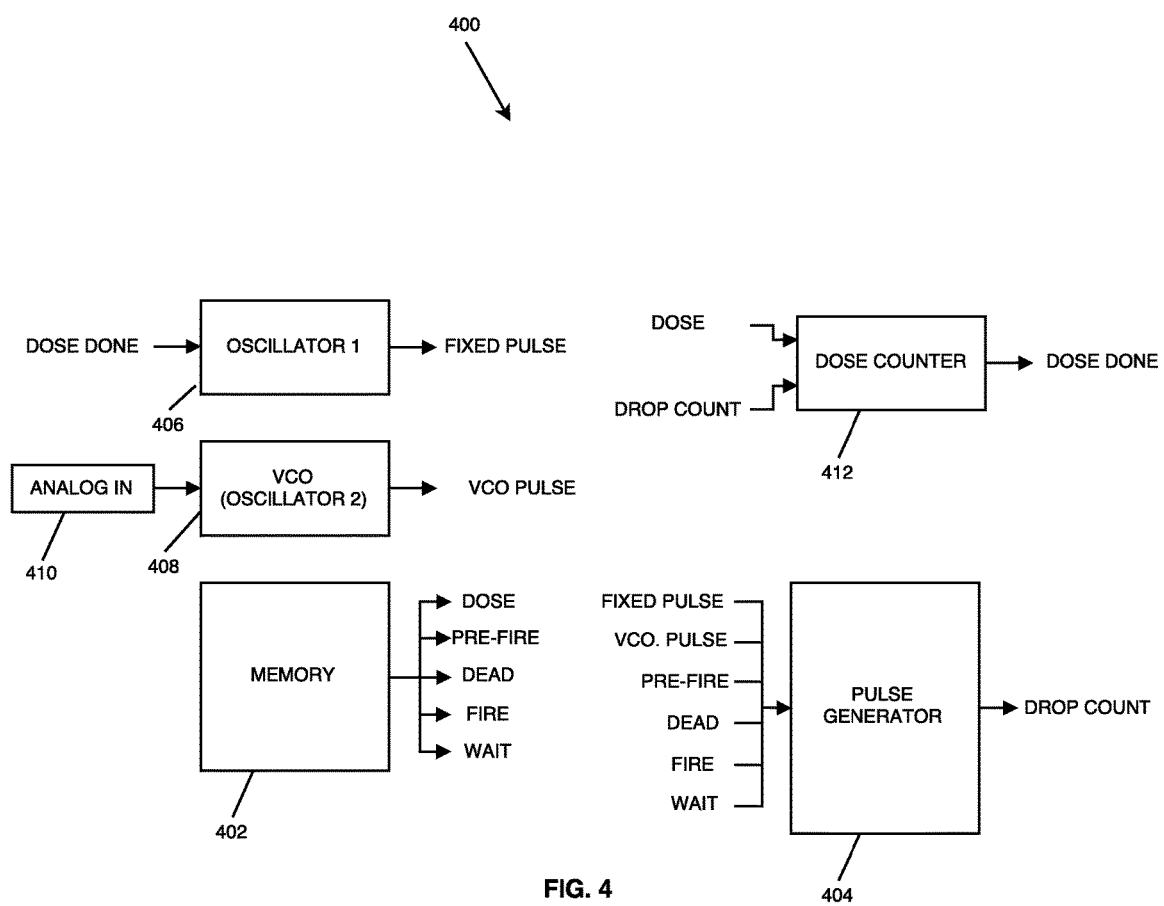
FIG. 4 is a somewhat diagrammatic representation of a pump according to the disclosure.

A somewhat diagrammatic representation of the programming and certain aspects of another embodiment of a pump 400, including the inputs and outputs of each component shown, is provided in FIG. 4. The memory 402 stores data and variables used by the pump 400, including the desired dose and the total administered dose as well as the control variables for the pre-fire, dead, fire, and wait steps. That data is read by a pulse generator 404 to set the timing for each of the firing sequence steps. The pulse generator 404 may be understood to operate in a similar fashion to the power circuit 312 and the logic circuit 314 described above. A first oscillator 406 generates a fixed frequency timing pulse which is read by the pulse generator 404 to control the timing of the pre-fire, dead, and fire steps. A second oscillator 408, shown here as a VCO, generates a variable frequency (VCO) timing pulse which is read by the pulse generator 404 to control the timing of the wait step. An analog input 410 provides an input signal to the second oscillator 408 for varying the variable frequency timing pulse. Once a firing sequence is complete, a drop count signal is sent to a drop counter 412, indicating that a set amount of fluid has been ejected. These totals are saved to the memory 402. The pulse generator 404 will cause the firing sequence to repeat and the drop counter 412 continues totaling the amount of fluid ejected, based on the number of firing sequences or drop counts, until the amount of fluid ejected is equal to the desired dose amount. Once the pulse generator 404 reads that those amounts are equal, it stops repeating the firing sequence and the pump is shut down.

In operation, the fixed frequency signal, provided by the first oscillator, functions essentially as a clock that provides pulses at a constant interval. Each of the time-critical steps are initiated in sequential order and last for a certain amount of time or until a certain number of fixed frequency time ($T_f$) pulses, given by the predetermined fixed frequency signal from the first oscillator, have elapsed. The wait step occurs in sequential order and lasts until a certain number of variable frequency time ($T_v$) pulses, given by the variable frequency signal from the second oscillator, have elapsed. For example, a logic circuit may be configured (programmed) so that the pre-fire step, dead step, and fire steps last for $T_f$=5, 3, and 1 fixed frequency pulses, respectively, where each timing pulse equals 1 second. The logic circuit may also be programmed to that the wait step lasts for $T_v$=2 pulses. In that case, the logic circuit would send a control signal (a power on signal) to the power circuit 112 to initiate the pre-fire step as soon as the first oscillator is activated. That control signal turns on the power circuit to initiate the pre-fire step and activate the firing mechanism for 5 time pulses. After 5 time pulses, the logic circuit would send another control signal (a power off signal) that causes the power circuit to deactivate the firing mechanism, thus ending the pre-fire step and initiating the dead step. After 3 additional time pulses, the logic circuit would send another control signal (a power on signal) that causes the power circuit to re-activate the firing mechanism for a single time pulse, thus ending the dead step and activating the fire step. After 1 fixed frequency pulse, the logic circuit would send a control signal (power off) instructing the firing mechanism to deactivate for 2 variable frequency time pulses, thus ending the firing step and initiating the wait step. The actual amount of time taken for 2 variable frequency time pulses will vary, based on the input signal from the first input. For example, at a first input, each timing pulse may require 1 second. However, at a second input, each timing pulse may require 5 seconds. After 2 variable frequency time pulses, the entire firing sequence would repeat.

Figure 5:
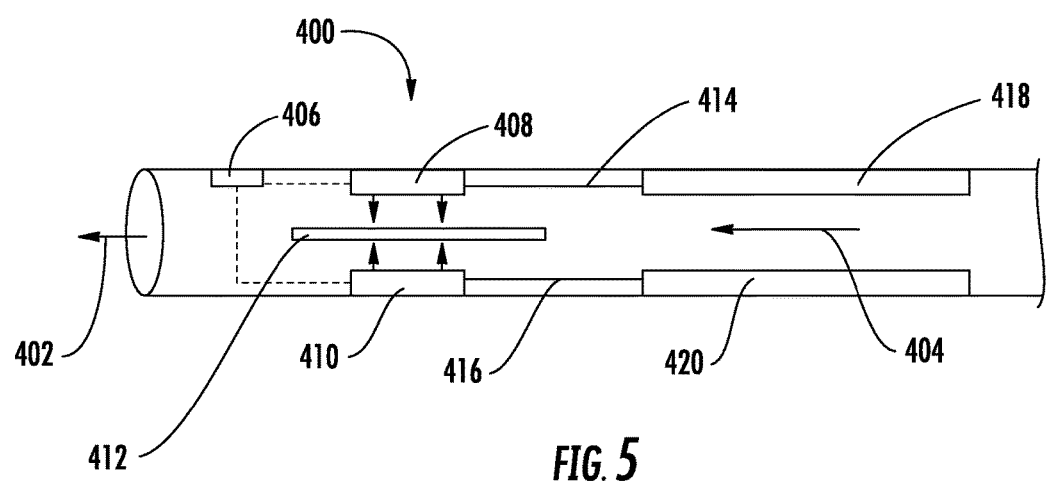
FIG. 5 is a schematic drawing of an electronic vapor cigarette having a microfluidic pump according to an embodiment of the present disclosure.

Referring now to FIG. 5 an e-cigarette (electronic vapor cigarette) 400 is shown and constitutes another embodiment of the present invention. Airflow is directed through the e-cigarette in the direction indicated by the arrows 402 and 404. A pressure sensor 406 is provided near the output of the e-cigarette 400 (the left and as shown in FIG. 5). As a user inhales, the restricted airflow within the e-cigarette 400 creates a low pressure zone in the vicinity of the pressure sensor 406. The pressure sensor 406 may be designed to detect the difference between the atmospheric pressure on the outside of the e-cigarette 400 and the pressure on the inside of the cigarette 400. As the strength of an inhale increases, the vacuum in the e-cigarette 400 increases and therefore the pressure at sensor 406 decreases compared to atmospheric pressure. Therefore, the difference between atmospheric pressure and the pressure within the e-cigarette 400 increases as the user inhales. The sensor 406 produces an analog output, preferably a voltage signal. This voltage signal is applied to a pair of microfluidic pumps 408 and 410. Any number of microfluidic pumps may be used including a single pump if desired. The microfluidic pumps 408 and 410 pump a liquid onto a heating surface 412, and the liquid is vaporized on the heating surface 412. When the user is inhaling, the vapor is drawn into the user's lungs.

Microfluidic pumps 408 and 410 are constructed in accordance with the microfluidic pumps described above particularly with regard to FIGS. 1 and 3. In this embodiment, each pump 408 and 410 includes a voltage controlled oscillator whose frequency varies with respect to the voltage produced by sensor 406. When the sensor 406 detects atmospheric pressure or near atmospheric pressure, it produces a zero voltage output. The voltage controlled oscillators in the pumps 408 and 410 respond to the zero voltage output by producing a zero frequency output or a very low frequency output. Thus, when the user is not inhaling the microfluidic pumps 408 and 410 will pump zero fluid onto the heater 412. Alternatively, the e-cigarette 400 may be designed to smoke slightly even when there is no inhalation. In this embodiment, when the sensor 406 detects atmospheric pressure or near atmospheric pressure, the voltage control oscillators will produce a low-frequency signal and the pumps 408 and 410 will respond to the low-frequency signal with a very low output over time. In other words, the pumps will eject some fluid, wait a very long time, and then eject more fluid. The long wait times create a very low flow of fluid onto the heater 412.

When the user inhales and the sensor 406 detects a pressure below atmospheric pressure, it will produce a higher voltage signal. The voltage of the output signal produced by 406 is proportional to the negative pressure detected by the sensor 406. In other words, as the air pressure within the e-cigarette 400 decreases, the voltage produced by the sensor 406 increases. In response to the increasing voltage of the output from sensor 406, the pumps 408 and 410 produce a greater flow of fluid onto the heater 412 because the wait time decreases as the frequency of the voltage control oscillator increases. Fluid is delivered to pumps 408 and 410 by supply lines 414 and 416, respectively, that are connected to reservoirs 418 and 420, respectively. Both pumps 408 and 410 are programmed to deliver a normal or desired dose of fluid when the sensor 406 detects a pressure corresponding to a normal inhale by a user of an e-cigarette. When a user inhales gently, the difference between ambient atmospheric pressure and the pressure within the e-cigarette 400 will be less than the pressure difference experienced during a normal inhale, and therefore the output voltage of the sensor 406 will be less, the frequency of the voltage control oscillator will be less, and the amount of fluid flow on to the heater 412 from the pumps 408 and 410 will be less.

The pumps 408 and 410 may be configured to increase the flow rate continuously up to the maximum output of the pumps which would occur when the frequency of the voltage controlled oscillator signal equals infinity. Thus, by sizing the maximum output of each of the pumps 408 and 410 and by limiting the number of pumps in the e-cigarette, a maximum flow rate for the liquid may be designed into the e-cigarette. Alternatively, additional logic may be incorporated into the pumps 408 and 410 so that there is a hard limit or cut off to the liquid flow rate that the pumps will deliver. However, it is preferred to use an analog control system, meaning that the output of the pumps 408 and 410 will remain proportional to the output voltage of the sensor 406. In such case, the maximum flow rate of the pumps 408 and 410 will be determined by the maximum output voltage of the sensor 406.

The sensor 406 could produce a different type of analog signal as its output and that analog signal could be used to indirectly control the voltage control oscillators. For example, the sensor 406 could produce an output signal in which the amperage of the signal varied proportionally to the sensed pressure. In such embodiment, the amperage of the output signal may be converted to a voltage signal and used to control the voltage control oscillators. Likewise, other types of analog characteristics could be detected in the output of the sensor 406 and those analog characteristics could be converted to a voltage that is used to control the voltage control oscillators of the pumps.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the invention in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:
1. A microfluidic pump for a fluid comprising:
a fluid supply source for supplying the fluid;
a firing chamber for carrying the fluid supplied by the fluid supply source;
a nozzle in fluid communication with the firing chamber;
a firing mechanism in fluid communication with the firing chamber, the firing mechanism configured to eject fluid out of the firing chamber through the nozzle during a firing sequence, the firing sequence comprising at least a firing step where the firing mechanism is activated and fluid is ejected from the firing chamber as a result of the firing mechanism activating followed by a wait step where the firing mechanism is deactivated for providing a time delay between subsequent firing steps;

a power circuit in electric communication with the firing mechanism for activating and deactivating the firing mechanism in response to a control signal;

a logic circuit in electric communication with the power circuit for sending the control signal to cause the power circuit to activate and deactivate the firing mechanism, the logic circuit being configured to activate the firing mechanism for a period of time that is dependent on a predetermined fixed frequency signal and deactivating the firing mechanism for a period of time that is dependent on at least a variable frequency signal for controlling the wait step;

a first oscillator in electric communication with the logic circuit for sending the predetermined fixed frequency signal to the logic circuit, the fixed frequency signal comprising a series of timing pulses wherein each pulse is separated by a fixed time interval;

a second oscillator in electric communication with the logic circuit for sending the variable frequency signal to the logic circuit, the variable frequency signal comprising a series of timing pulses wherein each pulse is separated by a variable time interval;

a first input for providing a variable input signal to the second oscillator, wherein the second oscillator is configured to vary the interval of time separating each pulse of the series of timing pulses of the variable frequency signal according to the variable input signal from the first input and wherein the logic circuit is configured to vary the control signal according to the frequency of the variable frequency signal from the second oscillator to vary the length of the wait step.

2. The microfluidic pump of claim 1 further comprising a microprocessor and wherein the logic circuit, first oscillator and second oscillator are a part of the microprocessor.

3. The microfluidic pump of claim 1 wherein the firing sequence further comprises a dead step where the firing mechanism is deactivated, the dead step occurring before the firing step and being controlled by the fixed frequency signal.

4. The microfluidic pump of claim 1 wherein the firing sequence further comprises a pre-fire step, where the firing mechanism is activated but fluid is not ejected from the firing chamber, the pre-fire step occurring before the firing step and being controlled by the fixed frequency signal.

5. The microfluidic pump of claim 1 further comprising:
a memory for storing a separate control variable associated with each of the firing sequence steps, wherein the fire step is sustained until a count of the timing pulses of the predetermined fixed frequency signal is equal to the control variable associated with the fire step, and the wait step is sustained until a count of the timing pulses of the variable frequency signal is equal to the control variable associated with the wait step; and
a second input for inputting the control variables into the memory.

6. The microfluidic pump of claim 5 wherein the firing sequence further comprises a dead step occurring before the firing step and a pre-fire step occurring before the dead step, wherein the logic circuit is configured to send the control signal to the power circuit for initiating the pre-fire step once a count of the timing pulses of the predetermined fixed frequency signal is equal to the control variable associated with the pre-fire step and to send the control signal to the power circuit for initiating the dead step once a count of the timing pulses of the predetermined fixed frequency signal is equal to the control variable associated with the dead step.

7. The microfluidic pump of claim 1 wherein the second oscillator comprises a voltage controlled oscillator (VCO) and wherein the variable input signal is a voltage provided by the VCO.

8. The microfluidic pump of claim 1 wherein the first input comprises a pressure sensor and wherein the variable input signal is a measurement of a pressure applied to the pressure sensor.

9. The microfluidic pump of claim 8 wherein the second oscillator comprises a voltage controlled oscillator (VCO) and wherein the first input is configured to convert the measurement of pressure applied to the pressure sensor to a voltage and to provide that voltage to the VCO as the variable input signal.

10. The microfluidic pump of claim 1 further comprising a dose counter, wherein the logic circuit is configured to send a signal to the dose counter at the completion of a firing sequence and wherein the dose counter registers that signal as a dose amount which is added to an administered dose amount, the dose counter configured to provide a termination signal to the logic circuit once the administered dose amount is equal to a desired dose amount, wherein in response to the termination signal the logic circuit sends the control signal to the power circuit to deactivate the firing mechanism and discontinue firing sequences.

11. The microfluidic pump of claim 10 further comprising a second input for inputting the desired dose amount and a memory for storing the desired dose amount.

12. The microfluidic pump of claim 1 further comprising a thermal injector chip and wherein the firing chamber, nozzle, firing mechanism, logic circuit, power circuit, first oscillator and second oscillator are a part of the thermal ejector chip.

13. The microfluidic pump of claim 12 wherein the thermal ejector chip is configured to eject the fluid into a moving air flow path.

14. An apparatus comprising:
a fluid supply source for supplying the fluid;
a firing chamber for carrying the fluid supplied by the fluid supply source;
a nozzle in fluid communication with the firing chamber;
a firing mechanism in fluid communication with the firing chamber, the firing mechanism configured to eject fluid out of the firing chamber through the nozzle during a firing sequence, the firing sequence comprising at least a firing step where the firing mechanism is activated and fluid is ejected from the firing chamber as a result of the firing mechanism activating followed by a wait step where the firing mechanism is deactivated for providing a time delay between subsequent firing steps;
a power circuit in electric communication with the firing mechanism for activating and deactivating the firing mechanism in response to a control signal;
a logic circuit in electric communication with the power circuit for sending the control signal to cause the power circuit to activate and deactivate the firing mechanism, the logic circuit being configured to activate the firing mechanism for a period of time that is dependent on a predetermined fixed frequency signal and deactivating the firing mechanism for a period of time that is dependent on at least a variable frequency signal for controlling the wait step;
a first oscillator in electric communication with the logic circuit for sending a predetermined fixed frequency signal to the logic circuit, the fixed frequency signal comprising a series of timing pulses wherein each pulse is separated by a fixed time interval;

a second oscillator in electric communication with the logic circuit for sending a variable frequency signal to the logic circuit, the variable frequency signal comprising a series of timing pulses wherein each pulse is separated by a variable time interval;

a first input for providing a variable input signal to the second oscillator, wherein the second oscillator is configured to vary the interval of time separating each pulse of the series of timing pulses of the variable frequency signal according to the variable input signal from the first input and wherein the logic circuit is configured to vary the control signal according to the frequency of the variable frequency signal from the second oscillator to vary the length of the wait step;

a thermal injector chip, wherein the firing chamber, nozzle, firing mechanism, logic circuit, power circuit, first oscillator and second oscillator are a part of the thermal ejector chip, an e-cigarette having an air passageway, the thermal ejector chip being mounted within the e-cigarette and connected to receive a fluid from the fluid supply source;

a sensor disposed in the e-cigarette for detecting when a user is inhaling through the e-cigarette and for producing an analog signal corresponding to the inhalation, the analog signal being connected to the first input to provide the control signal to the voltage controlled oscillator, and a heater disposed in the e-cigarette and positioned adjacent the ejector chip to receive and vaporize fluid ejected from the ejector chip.

15. A programmable microfluidic pump for a fluid comprising:

a fluid supply source for supplying the fluid;

a firing chamber for carrying the fluid supplied by the fluid supply source;

a nozzle in fluid communication with the firing chamber;

a firing mechanism in fluid communication with the firing chamber, the firing mechanism configured to eject fluid out of the firing chamber through the nozzle during a firing sequence, the firing sequence comprising, in sequential order, a pre-fire step where the firing mechanism is activated without causes fluid to be ejected from the firing chamber, a dead step where the firing mechanism is deactivated, a firing step where the firing mechanism is activated and fluid is ejected from the firing chamber, and a wait step where the firing mechanism is deactivated for providing a time delay before the next firing sequence begins;

a power circuit in electric communication with the firing mechanism for activating and deactivating the firing mechanism in response to a control signal;

a logic circuit in electric communication with the power circuit for sending the control signal to cause the power circuit to activate and deactivate the firing mechanism, the control signal being dependent on a predetermined fixed frequency signal for controlling the pre-fire, dead, and firing steps and being dependent on a variable frequency signal for controlling the wait step;

a first oscillator in electric communication with the logic circuit for sending the predetermined fixed frequency signal to the logic circuit, the fixed frequency signal comprising a series of timing pulses wherein each pulse is separated by a fixed time interval;

a second oscillator in electric communication with the logic circuit for sending the variable frequency signal to the logic circuit, the variable frequency signal comprising a series of timing pulses wherein each pulse is separated by a variable time interval;

a first input for providing a variable input signal to the second oscillator, wherein the second oscillator is configured to vary the interval of time separating each pulse of the series of timing pulses of the variable frequency signal according to the variable input signal from the first input and wherein the logic circuit is configured to vary the control signal according to the frequency of the variable frequency signal from the second oscillator to vary the length of the wait step;

a memory for storing a separate control variable associated with each of the firing sequence steps, wherein the pre-fire step is sustained until a count of the timing pulses of the fixed frequency signal is equal to the control variable associated with the pre-fire step, the dead step is sustained until a count of the timing pulses of the predetermined fixed frequency signal is equal to the control variable associated with the dead steps, the fire step is sustained until a count of the timing pulses of the predetermined fixed frequency signal is equal to the control variable associated with the fire step, and the wait step is sustained until a count of the timing pulses of the variable frequency signal is equal to the control variable associated with the wait step; and a second input for inputting the control variables into the memory.

16. The programmable microfluidic pump of claim 15 wherein the second oscillator comprises a voltage controlled oscillator (VCO) and wherein the variable input signal is a voltage provided by the VCO.

17. The programmable microfluidic pump of claim 15 wherein the first input comprises a pressure sensor and wherein the variable input signal is a measurement of a pressure applied to the pressure sensor.

18. The programmable microfluidic pump of claim 17 wherein the second oscillator comprises a voltage controlled oscillator (VCO) and wherein the first input is configured to convert the measurement of pressure applied to the pressure sensor to a voltage and to provide that voltage to the VCO as the variable input signal.

19. The microfluidic pump of claim 15 further comprising a dose counter, wherein the logic circuit is configured to send a signal to the dose counter at the completion of a firing sequence and wherein the dose counter registers that signal as a dose amount which is added to an administered dose amount, the dose counter configured to provide a termination signal to the logic circuit once the administered dose amount is equal to a desired dose amount, wherein in response to the termination signal the logic circuit sends the control signal to the power circuit to deactivate the firing mechanism and discontinue firing sequences.

20. The microfluidic pump of claim 19 further comprising a second input for inputting the desired dose amount and a memory for storing the desired dose amount.

21. The microfluidic pump of claim 15 wherein the firing chamber, nozzle, firing mechanism, logic circuit, power circuit, first oscillator and second oscillator comprise a thermal ejector chip configured to eject the fluid into a moving air flow path.

\* \* \* \* \*